United States Patent
Tang et al.

(10) Patent No.: US 9,885,380 B2
(45) Date of Patent: Feb. 6, 2018

(54) CROSSHEAD COMPONENT OF LARGE DIESEL ENGINE

(71) Applicant: JIANGSU UNIVERSITY OF SCIENCE AND TECHNOLOGY, Jiangsu (CN)

(72) Inventors: Wenxian Tang, Jiangsu (CN); Zhigang Pan, Jiangsu (CN); Jian Zhang, Jiangsu (CN); Zhaohui Wu, Jiangsu (CN); Dabao Li, Jiangsu (CN); Xiaorong Wang, Jiangsu (CN); Shijie Su, Jiangsu (CN)

(73) Assignee: Jiangsu University of Science and Technology, Jiangsu (CN)

( * ) Notice: Subject to any disclaimer, the term of this patent is extended or adjusted under 35 U.S.C. 154(b) by 0 days.

(21) Appl. No.: 15/316,749

(22) PCT Filed: Jun. 1, 2015

(86) PCT No.: PCT/CN2015/080455
§ 371 (c)(1),
(2) Date: Dec. 6, 2016

(87) PCT Pub. No.: WO2016/011851
PCT Pub. Date: Jan. 28, 2016

(65) Prior Publication Data
US 2017/0184147 A1  Jun. 29, 2017

(30) Foreign Application Priority Data
Jul. 24, 2014 (CN) .......................... 2014 1 0357366

(51) Int. Cl.
*F16C 5/00* (2006.01)
*F16C 33/00* (2006.01)
*F16C 33/10* (2006.01)

(52) U.S. Cl.
CPC ................ *F16C 5/00* (2013.01); *F16C 33/00* (2013.01); *F16C 33/10* (2013.01)

(58) Field of Classification Search
CPC ...... F16C 5/00; F16C 9/02; F16C 9/04; F16C 33/1045
See application file for complete search history.

(56) References Cited

U.S. PATENT DOCUMENTS 1,661,790 A * 3/1928 Crawford .................. F16N 9/04
                                                                184/5
1,767,484 A * 6/1930 Schlacks ................... F16C 5/00
                                                                105/84

(Continued)

FOREIGN PATENT DOCUMENTS

CN      1458399 A     11/2003
CN     10839172 A      9/2010

(Continued)

OTHER PUBLICATIONS

International Search Report and Written Opinion by State Intellectual Property Office of the P.R. China of PCT/CN2015/080455, dated Sep. 11, 2015, 10 pp.

(Continued)

*Primary Examiner* — Phillip A Johnson
(74) *Attorney, Agent, or Firm* — Edwin S. Flores; Chalker Flores, LLP

(57) ABSTRACT

Disclosed is a crosshead component of a large diesel engine. The crosshead component consists of a crosshead pin (1), slide blocks (2), wear-resisting plates (3), sealing covers (4), and a sleeve (5), and has a structure with H-shaped cross and longitudinal sections. The crosshead pin (1) is a cylinder provided with petal-shaped through holes. The slide blocks (2) are respectively fitted on and connected to outer circles of left and right ends of the crosshead pin (1). The sleeve (5) is inserted in and connected to the petal-shaped through (Continued)

holes (112) of the crosshead pin (1) to form oil inlet/return way cavities. Left and right end surfaces of the crosshead pin (1) are respectively connected to the sealing covers (4) for sealing the oil way cavities. Front and back ends of the slide blocks (2) are respectively connected to the wear-resisting plates (3). The crosshead component has excellent interchangeability, economy and convenience.

7 Claims, 10 Drawing Sheets

(56) References Cited

U.S. PATENT DOCUMENTS

| | | | | |
|---|---|---|---|---|
| 1,820,638 | A * | 8/1931 | Tower | F16J 7/00 |
| | | | | 279/97 |
| 2,037,209 | A * | 4/1936 | Buckwalter | F16C 5/00 |
| | | | | 403/158 |
| 3,647,320 | A | 3/1972 | Chilman et al. | |

FOREIGN PATENT DOCUMENTS

| | | | |
|---|---|---|---|
| CN | 103321746 A | 9/2013 | |
| CN | 104196870 A | 12/2014 | |
| DE | 3224916 A1 * | 1/1984 | ............ F02F 7/0007 |
| GB | 1178682 A * | 1/1970 | ................ F16C 5/00 |
| GB | 1283308 A * | 7/1972 | ................ F16C 5/00 |
| WO | WO-2013163787 A1 * | 11/2013 | .............. F04B 53/14 |
| WO | 2016011851 | 1/2016 | |

OTHER PUBLICATIONS

Machine Translation of WO2016011851.
Machine Translation of CN1458399.
Machine Translation of CN10839172.
Machine Translation of CN103321746.
Machine Translation of CN104196870.
Machine Translation of JP2010276016.
English translation of International Search Report and Written Opinion by State Intellectual Property Office of the P.R. China of PCT/CN2015/080455, dated Sep. 11, 2015, 10 pp.

* cited by examiner

A–A

US 9,885,380 B2

CROSSHEAD COMPONENT OF LARGE DIESEL ENGINE

CROSS-REFERENCE TO RELATED APPLICATIONS

This application is the National Stage of International Application No. PCT/CN2015/080455, filed on 1 Jun. 2015 claiming the priority if NC 201410357366.4 filed on 24 Jul. 2014, the content of each of which is incorporated by reference herein.

BACKGROUND OF THE INVENTION

Field of the Invention

The present invention relates to the field of mechanical design, and more particularly to a structure of a crosshead component of a large low-speed two-stroke diesel engine.

Description of Related Art

A crosshead component is generally used in a large low-speed two-stroke diesel engine. The crosshead component is fixed at a lower end of a piston rod, and is in bearing connection with a small end of a connecting rod through a crosshead pin in the crosshead component, thereby effectively transmitting power on a piston to the connecting rod and a crankshaft. Meanwhile, a side thrust produced during the working process of a crank connecting rod mechanism is transmitted by slide blocks on two sides of the crosshead pin in the crosshead component to guide plates fixed on two sides of a frame, thereby improving the working conditions of the piston and a cylinder sleeve and ensuring that good coaxality between the piston center and the cylinder center is maintained.

The crosshead component in the existing design has the following disadvantages: (1) the crosshead pin has heavy weight and the reciprocating inertia force produced during the up-and-down reciprocating motion of the crosshead pin is large, so that the load on the crankshaft connecting rod mechanism is increased and the assembly becomes more difficult; (2) the parts that move relative to each other in the crosshead component have large friction there-between, a large amount of heat is produced, and the heat dissipation effect is poor, so that the parts may easily fail due to thermal fatigue; (3) the two sliding surfaces of the slide blocks in the existing design are cast with an abrasion-resistant alloy for alleviating the frictional abrasion; however, the whole slide blocks need to be replaced in the case of serious abrasion, and thus plenty of materials are wasted and the maintenance cost is increased.

SUMMARY OF THE INVENTION

Technical Problem

An objective of the present invention is to provide a crosshead component applicable to a large low-speed two-stroke diesel engine, which has a light structure, provides sufficient oil supply, has good heat dissipation performance, and can be easily replaced in the case of abrasion, thereby solving the defects and deficiencies in the crosshead component of the existing design.

Technical Solution

To achieve the above objective, the present invention adopts the following technical solution to solve the above problem.

A crosshead component of a large diesel engine consists of a crosshead pin 1, slide blocks 2, wear-resisting plates 3, sealing covers 4, and a sleeve 5, and has a structure with H-shaped cross and longitudinal sections. The crosshead pin 1 is a cylinder provided with petal-shaped through holes 112. The slide blocks 2 are respectively fitted on and connected to outer circles of left and right ends of the crosshead pin 1. The sleeve 5 is inserted in and connected to the petal-shaped through holes 112 of the crosshead pin 1 to form oil inlet/return way cavities. Left and right end surfaces of the crosshead pin 1 are respectively connected to the sealing covers 4 for sealing the oil way cavities. Front and back ends of the slide blocks 2 are respectively connected to the wear-resisting plates 3.

The crosshead pin 1 is a cylinder provided with the petal-shaped through holes 112, planes 101 matching with the slide blocks 2 are symmetrically provided, in an over-center manner, on front and back outer circumference surfaces at the left and right ends of the crosshead pin 1, each of the planes 101 is provided with an oil hole 102 in communication with the petal-shaped through holes 112 of the crosshead pin 1, and a rectangular plane 103 for positioning a piston rod is provided on an upper outer circumference surface at the center of the crosshead pin 1. Two piston rod threaded holes 104 in connection to the piston rod, four piston rod oil return holes 106 in communication with the petal-shaped through holes 112 of the crosshead pin 1 and one piston rod oil inlet hole 105 at the center of the rectangular plane 103 are provided on the rectangular plane 103 in an over-center manner. A crosshead pin oil inlet hole 107 and a crosshead pin oil outlet hole 108 that are in communication with the petal-shaped through holes 112 of the crosshead pin 1 and are perpendicular to the rectangular plane 103 are provided on the upper part of the outer circumference surface at the left and right ends of the crosshead pin 1.

An axial deep hole 109 that is in communication with the piston rod oil return holes 106 and in parallel with the axis is provided on the upper part of the left end surface of the crosshead pin 1 and away from the axial center, and a shallow hole 110 perpendicular to and in communication with the axial deep hole 109 is provided on an outer circumference surface of an initial end of the axial deep hole 109. A via hole 111 radially passing through the crosshead pin 1 and in communication with the shallow hole 110 is provided at a position away from the shallow hole 110 and corresponding to the shallow hole 110 in an anticlockwise direction about the axis.

The petal-shaped through holes 112 provided on the crosshead pin 1 are quincuncial, the petal-shaped through holes 112 are communicated by using a provided spiral through groove 115, and three bearing bush oil inlet holes 114 in communication with the petal-shaped through holes 112 are uniformly provided on the circumference surface at the center of the crosshead pin 1, for lubricating and cooling a bearing bush between the crosshead pin 1 and a small end of a connecting rod.

Each of the slide blocks 2 consists of a slender waist-shaped plate in the middle and strip-shaped plates at front and back ends in perpendicular connection, a slotted hole 201 matching with one of the two ends of the crosshead pin 1 is provided at the center of the slender waist-shaped plate, four trapezoidal lightening holes 202 are uniformly provided around the slotted hole 201, and the width of the strip-shaped plates is larger than the thickness of the slender waist-shaped plate. A slide block side oil hole 203 in communication with the slotted hole 201 is provided at the center of the strip-shaped plates at the front and back ends of the slide block 2, and a waist-shaped arc surface on the upper part of the slender waist-shaped plate is provided with a slide block upper oil hole 204 in communication with the slotted hole 201.

Each of the wear-resisting plates 3 is channel steel-shaped, fitted on the strip-shaped plate, and connected to the strip-shaped plate through wear-resisting plate screws 7 and four counter bores 301 uniformly provided on a working surface of the wear-resisting plate 3. The working surface of the wear-resisting plate 3 is cast with an abrasion-resistant alloy, a wear-resisting plate oil inlet hole 302 is provided at the center of the wear-resisting plate 3, and an oil groove 303 in communication with the wear-resisting plate oil inlet hole 302 is provided on the working surface of the wear-resisting plate 3, for lubricating the working surface of the wear-resisting plate 3 on the slide block, thereby reducing the friction and abrasion.

Each of the sealing covers is provided with a central hole 401 having a hole diameter identical to the inner diameter of the sleeve 5, four sealing cover screw positioning holes 402 are uniformly provided on the circumference away from the central hole 401, and sealing cover screws 6 pass through the four sealing cover screw positioning holes 402 to fix the sealing covers 4 to the left and right end surfaces of the crosshead pin 1, such that the oil holes in the crosshead pin 1 are sealed, leakage of the cooled oil is prevented, and the sleeve 5 is not sealed, thereby ensuring that the through holes in the sleeve 5 can contact air and the cooling effect is improved.

The length of the sleeve 5 is identical to that of the crosshead pin 1, the outer diameter of the sleeve 5 is slightly larger than the inner diameter of the petal-shaped through holes 112 of the crosshead pin 1, and the sleeve 5 and the petal-shaped through holes 112 are in close-fit connection through a shrinkage fit process, with the interference fit tolerance δ of 0.03 to 0.06 mm.

Advantageous Effect

The crosshead component of a large diesel engine in the present invention has the following advantages and beneficial effects:

1. The crosshead pin is internally provided with the petal-shaped through holes that are communicated by using the spiral through groove, such that the weight of the pin shaft is reduced, the influence of the crosshead pin on the load of the crank connecting rod mechanism is reduced and the assembly difficulty is lowered.

2. The crosshead pin adopts an interference fit structure of the sleeve and the petal-shaped through holes, the contact area between the lubricant inside the crosshead pin and the pin shaft is increased, and the sleeve directly contact air, thereby achieving better cooling and heat dissipation effects.

3. The replaceable wear-resisting plates are installed on the external sides of the slide blocks, and thus only the wear-resisting plates need to be replaced in the case of serious abrasion, instead of replacing the whole slide blocks; therefore, the crosshead component has excellent interchangeability, economy and convenience.

Figure 1:
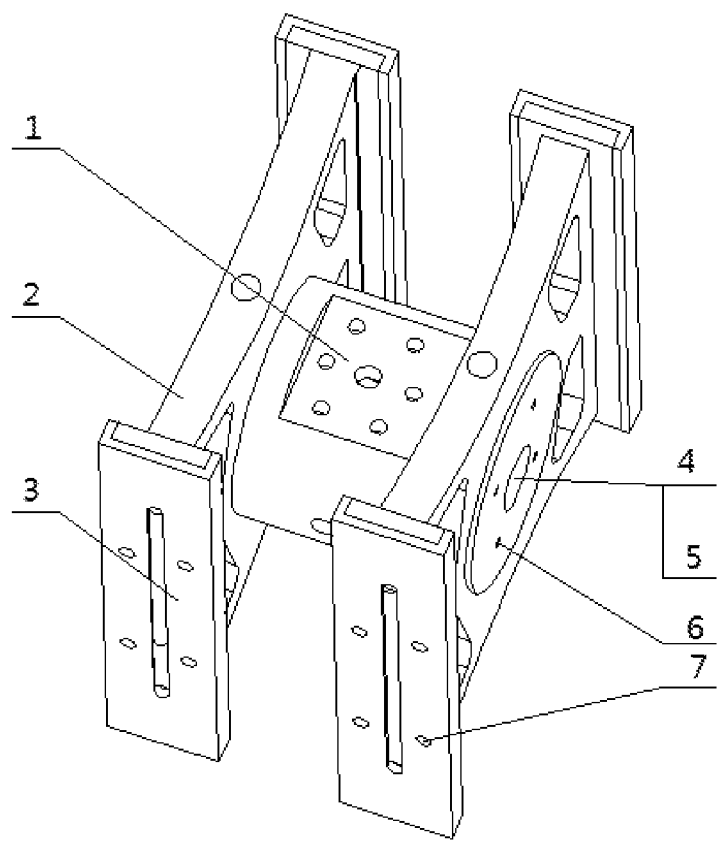
FIG. 1 is a schematic structural view of the present invention.
Figure 2:
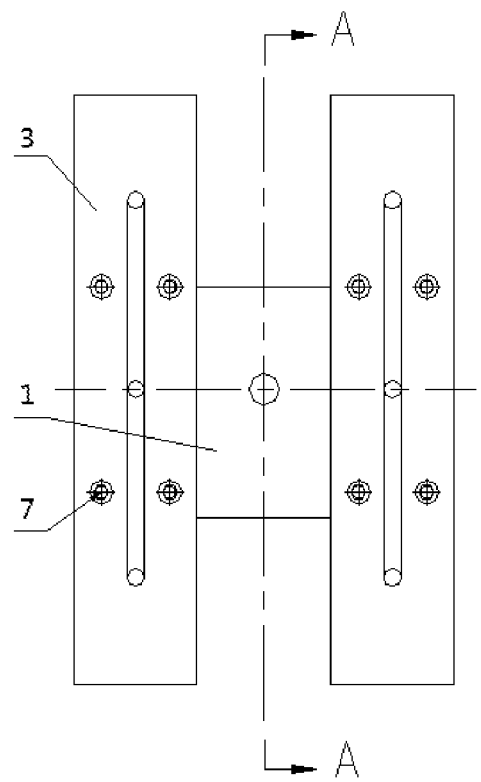
FIG. 2 is a front view of the present invention in FIG. 1.
Figure 3:
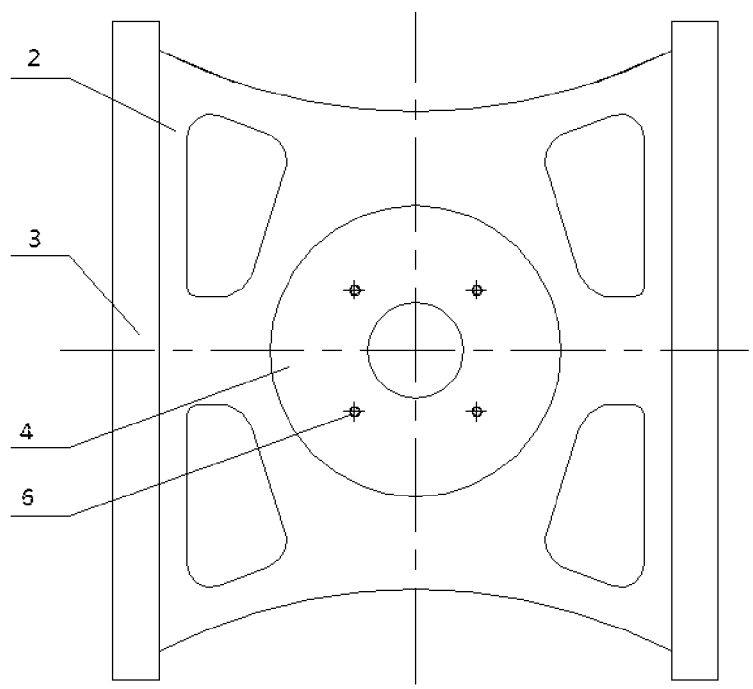
FIG. 3 is a left view of the present invention in FIG. 1.
Figure 4:
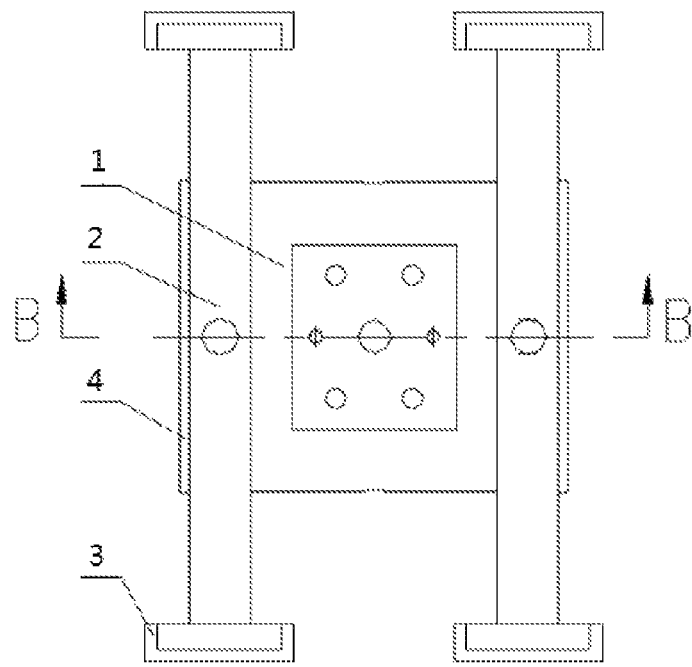
FIG. 4 is a top view of the present invention in FIG. 1.
Figure 5:
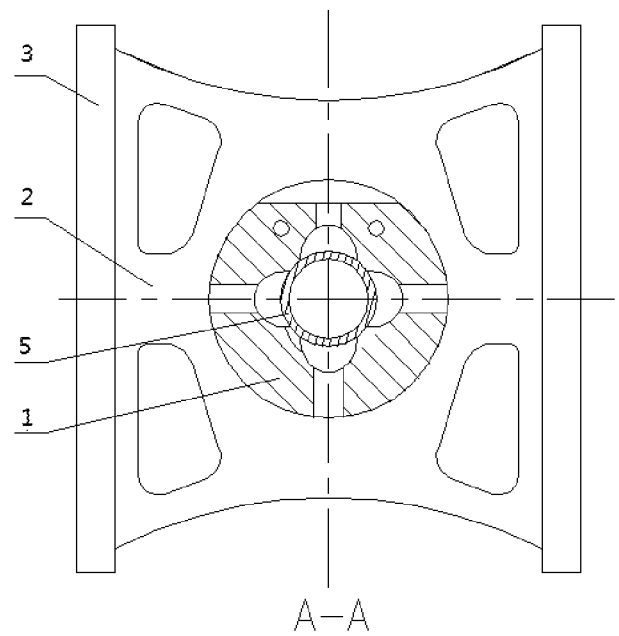
FIG. 5 is a cross-sectional view along A-A in FIG. 2.
Figure 6:
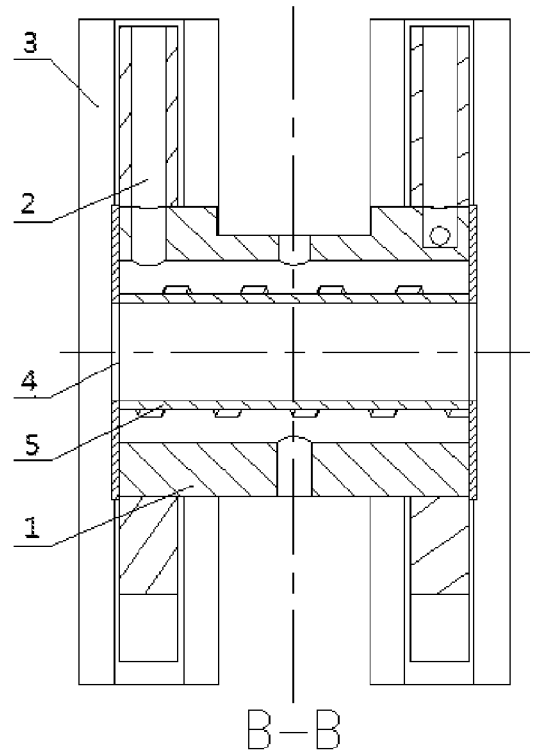
FIG. 6 is a cross-sectional view along B-B in FIG. 4.
Figure 7:
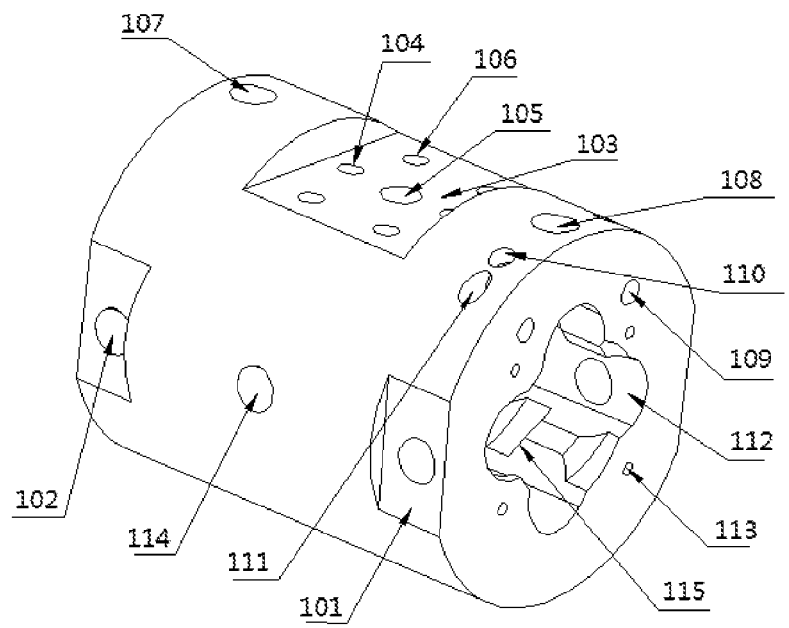
FIG. 7 is a schematic structural view of a crosshead pin.
Figure 8:
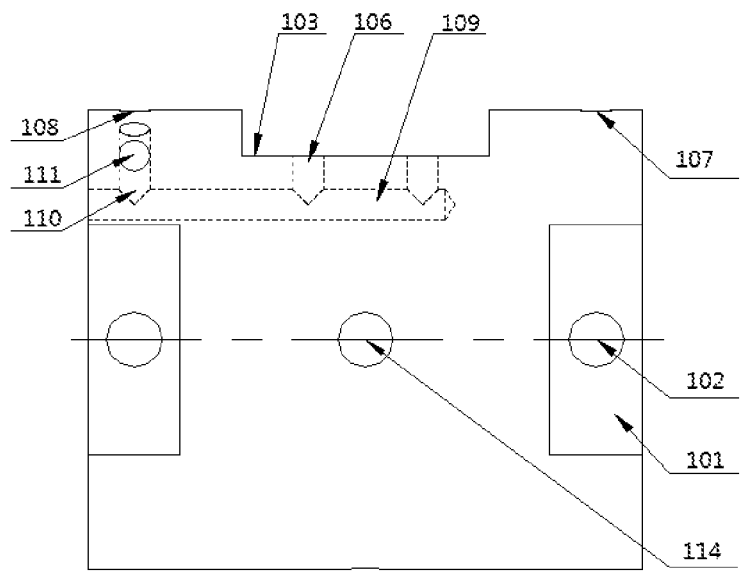
FIG. 8 is a front view of the crosshead pin in FIG. 7.
Figure 9:
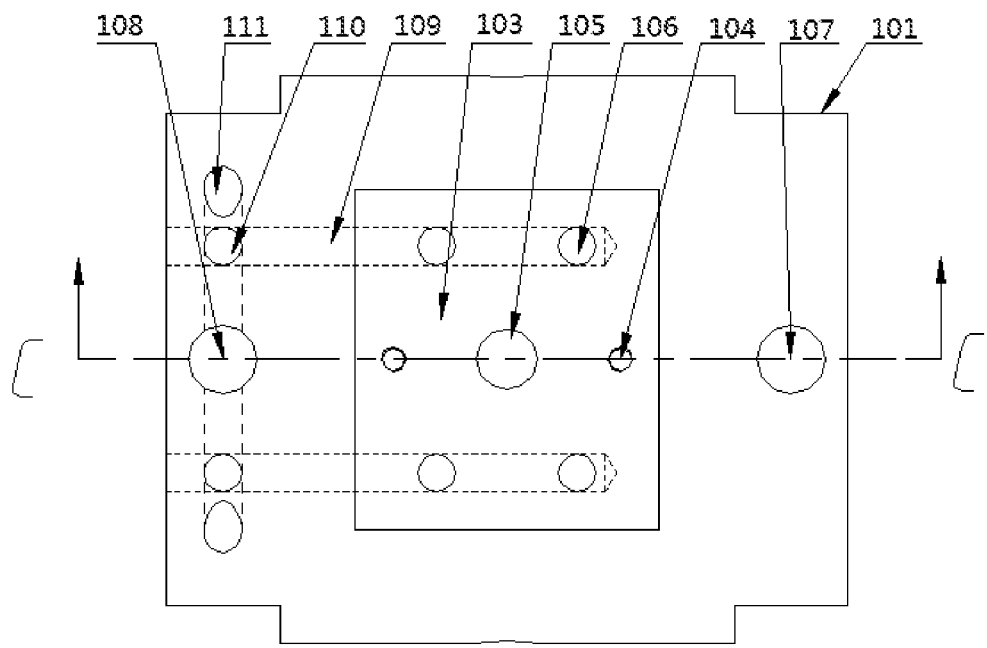
FIG. 9 is a top view of the crosshead pin in FIG. 7.
Figure 10:
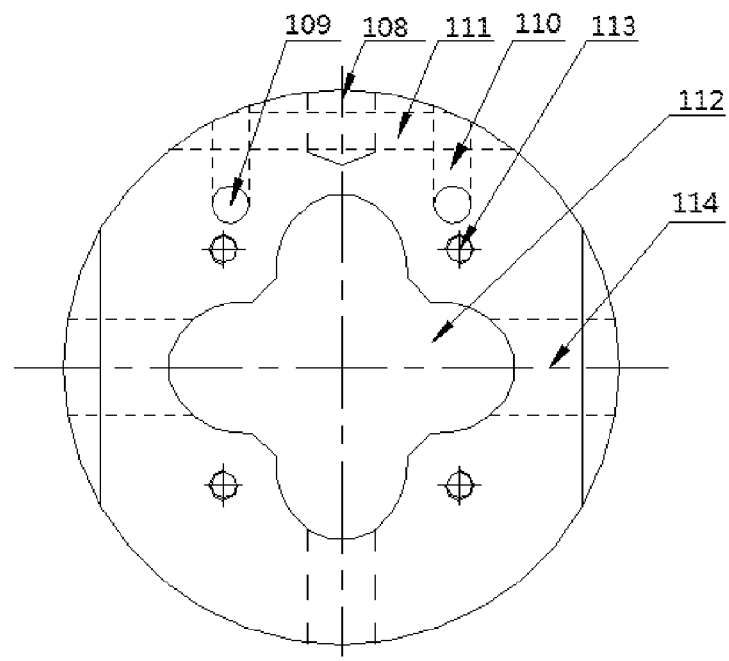
FIG. 10 is a left view of the crosshead pin in FIG. 7.
Figure 11:
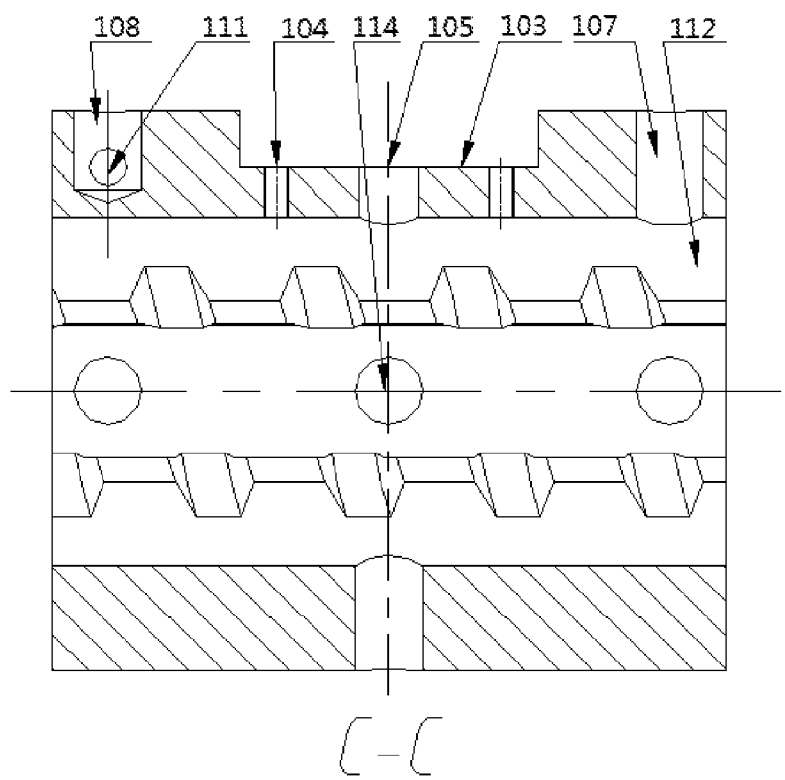
FIG. 11 is a cross-sectional view along C-C in FIG. 9.
Figure 12:
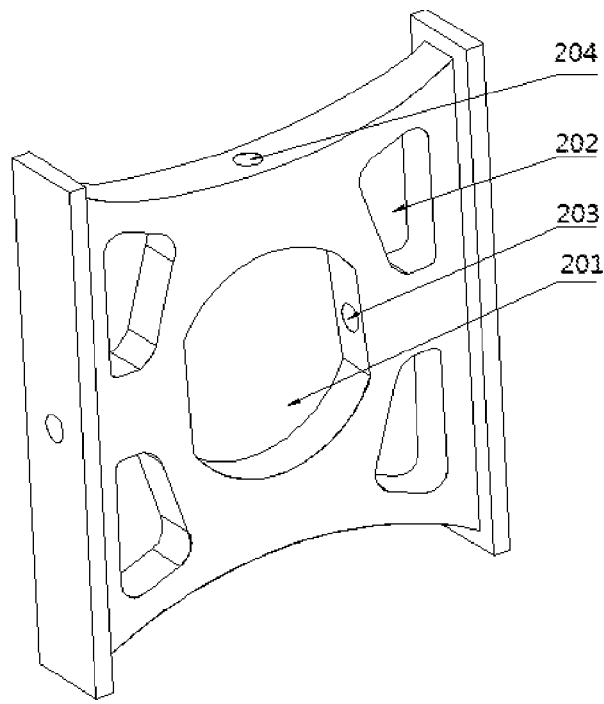
FIG. 12 is a schematic structural view of a slide block.
Figure 13:
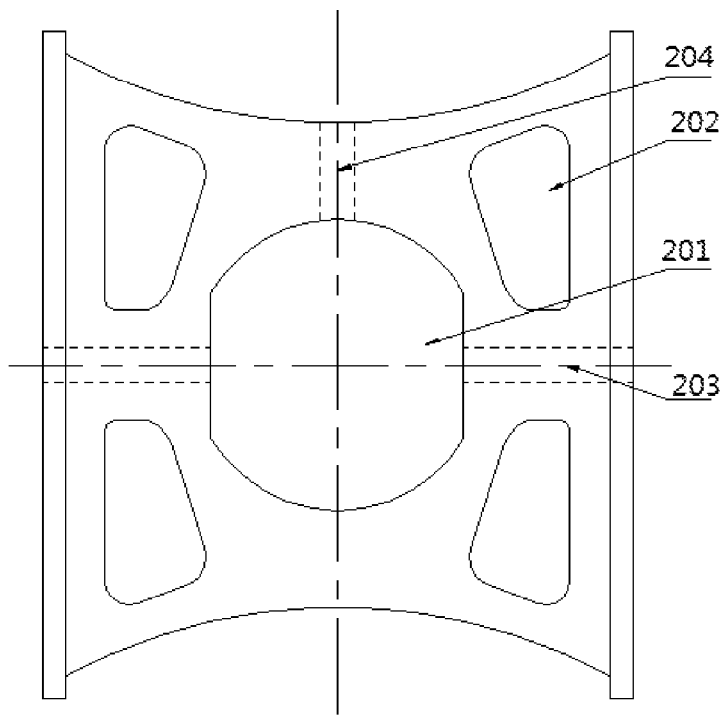
FIG. 13 is a front view of the slide block in FIG. 12.
Figure 14:
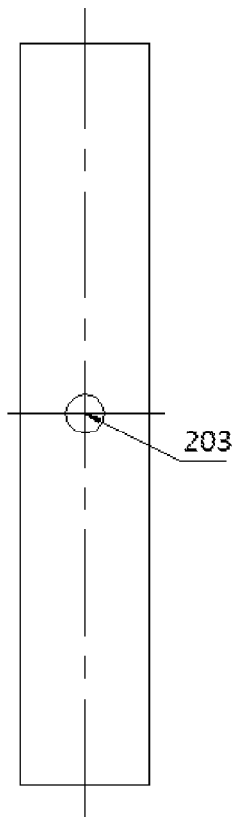
FIG. 14 is a left view of the slide block in FIG. 12.
Figure 15:
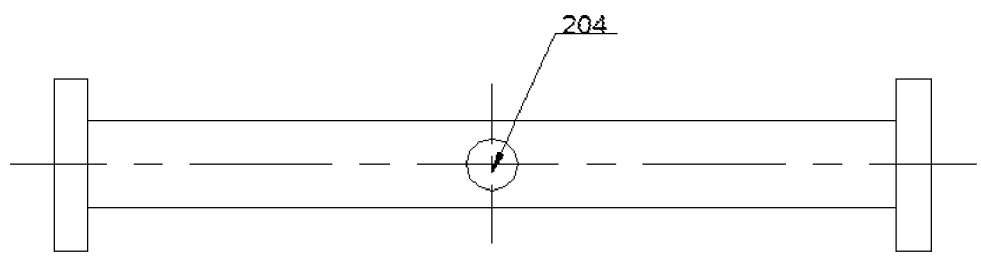
FIG. 15 is a top view of the slide block in FIG. 12.

In the drawings: 1—crosshead pin, 101—plane, 102—oil hole, 103—rectangular plane, 104—piston rod threaded hole, 105—piston rod oil inlet hole, 106—piston rod oil return hole, 107—crosshead pin oil inlet hole, 108—crosshead pin oil outlet hole, 109—axial deep hole, 110—shallow hole, 111—via hole, 112—petal-shaped through hole, 113—sealing cover screw threaded hole, 114—bearing bush oil inlet hole, 115—spiral through groove, 2—slide block, 201—slotted hole, 202—lightening hole, 203—slide block side oil hole, 204—slide block upper oil hole, 3—wear-resisting plate, 301—counter bore, 302—wear-resisting plate oil inlet hole, 303—oil groove, 4—sealing cover, 401—central hole, 402—sealing cover screw positioning hole, 5—sleeve, 6—sealing cover screw, 7—wear-resisting plate screw.

DETAILED DESCRIPTION OF THE INVENTION

In order to make the objectives and technical solutions of the embodiments of the present invention clearer, the technical solutions of the present invention are clearly and completely described below with reference to the accompanying drawings and embodiments.

One of ordinary skill in the art can understand that unless otherwise defined, all terms (including technical and scientific terms) used herein have the same meaning as commonly understood by one of ordinary skill in the art to which this invention belongs.

The terms "inner" and "outer" in the present invention respectively refer to, relative to the component itself, the direction toward the interior of the component and the opposite direction, and are not intended to particularly limit the component of the present invention.

The terms "left" and "right" in the present invention respectively refer to, when a reader is facing the drawing, the left side of the reader and the right side of the reader, and are not intended to particularly limit the component of the present invention.

The term "connection" in the present invention may refer to direct connection between parts or indirection connection between parts by means of other parts.

The terms "front" and "back" in the present invention refer to, when a reader is facing the drawing, being close to the reader and being away from the reader, and are not intended to particularly limit the component of the present invention.

FIG. 1 to FIG. 6 are respectively views illustrating the structure and members of a crosshead component of a large diesel engine according to the present invention. The crosshead component consists of a crosshead pin 1, slide blocks 2, wear-resisting plates 3, sealing covers 4, and a sleeve 5, and has a structure with H-shaped cross and longitudinal sections. The crosshead pin 1 is a cylinder provided with petal-shaped through holes 112. The slide blocks 2 are respectively fitted on and connected to outer circles of left and right ends of the crosshead pin 1. The sleeve 5 is inserted in and connected to the petal-shaped through holes 112 of the crosshead pin 1 to form oil inlet/return way cavities. Left and right end surfaces of the crosshead pin 1 are respectively connected to the sealing covers 4 for sealing the oil way cavities. Front and back ends of the slide blocks 2 are respectively connected to the wear-resisting plates 3.

FIG. 7 to FIG. 11 are schematic structural views of the crosshead pin 1 respectively. The crosshead pin 1 is a cylinder provided with the petal-shaped through holes 112, planes 101 matching with the slide blocks 2 are symmetrically provided, in an over-center manner, on front and back outer circumference surfaces at the left and right ends of the crosshead pin 1, each of the planes 101 is provided with an oil hole 102 in communication with the petal-shaped through holes 112 of the crosshead pin 1, and a rectangular plane 103 for positioning a piston rod is provided on an upper outer circumference surface at the center of the crosshead pin 1. Two piston rod threaded holes 104 in connection to the piston rod, four piston rod oil return holes 106 in communication with the petal-shaped through holes 112 of the crosshead pin 1 and one piston rod oil inlet hole 105 at the center of the rectangular plane 103 are provided on the rectangular plane 103 in an over-center manner. A crosshead pin oil inlet hole 107 and a crosshead pin oil outlet hole 108 that are in communication with the petal-shaped through holes 112 of the crosshead pin 1 and are perpendicular to the rectangular plane 103 are provided on the upper part of the outer circumference surface at the left and right ends of the crosshead pin 1. An axial deep hole 109 that is in communication with the piston rod oil return holes 106 and in parallel with the axis is provided on the upper part of the left end surface of the crosshead pin 1 and away from the axial center, and a shallow hole 110 perpendicular to and in communication with the axial deep hole 109 is provided on an outer circumference surface of an initial end of the axial deep hole 109. A via hole 111 radially passing through the crosshead pin 1 and in communication with the shallow hole 110 is provided at a position away from the shallow hole 110 and corresponding to the shallow hole 110 in an anticlockwise direction about the axis.

The petal-shaped through holes 112 provided on the crosshead pin 1 are quincuncial, the petal-shaped through holes 112 are communicated by using a provided spiral through groove 115, and three bearing bush oil inlet holes 114 in communication with the petal-shaped through holes 112 are uniformly provided on the circumference surface at the center of the crosshead pin 1, for lubricating and cooling a bearing bush between the crosshead pin 1 and a small end of a connecting rod.

FIG. 12 to FIG. 15 are schematic structural views of the slide block 2 respectively. The slide block 2 consists of a slender waist-shaped plate in the middle and strip-shaped plates at front and back ends in perpendicular connection, a slotted hole 201 matching with one of the two ends of the crosshead pin 1 is provided at the center of the slender waist-shaped plate, four trapezoidal lightening holes 202 are uniformly provided around the slotted hole 201, and the width of the strip-shaped plates is larger than the thickness of the slender waist-shaped plate. A slide block side oil hole 203 in communication with the slotted hole 201 is provided at the center of the strip-shaped plates at the front and back ends of the slide block 2, and a waist-shaped arc surface on the upper part of the slender waist-shaped plate is provided with a slide block upper oil hole 204 in communication with the slotted hole 201.

Figure 16:
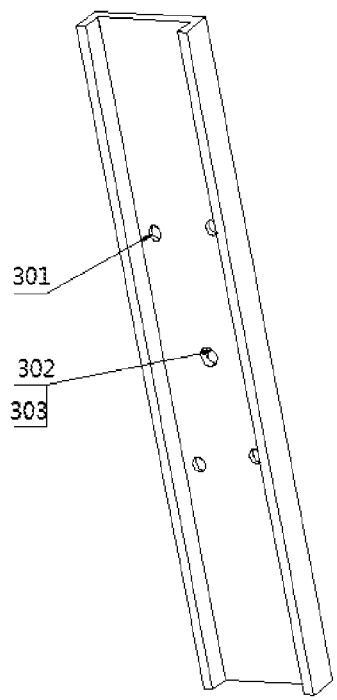
FIG. 16 is a schematic structural view of a wear-resisting plate.
Figure 17:
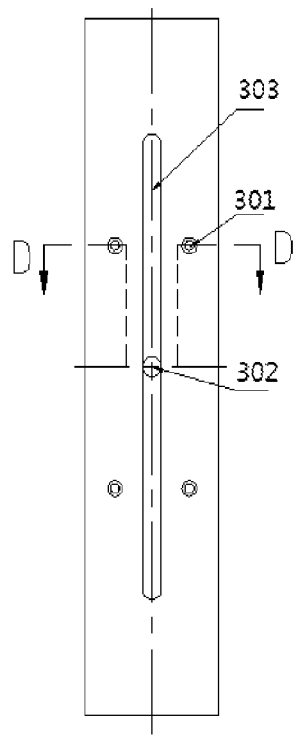
FIG. 17 is a front view of the wear-resisting plate in FIG. 16.
Figure 18:
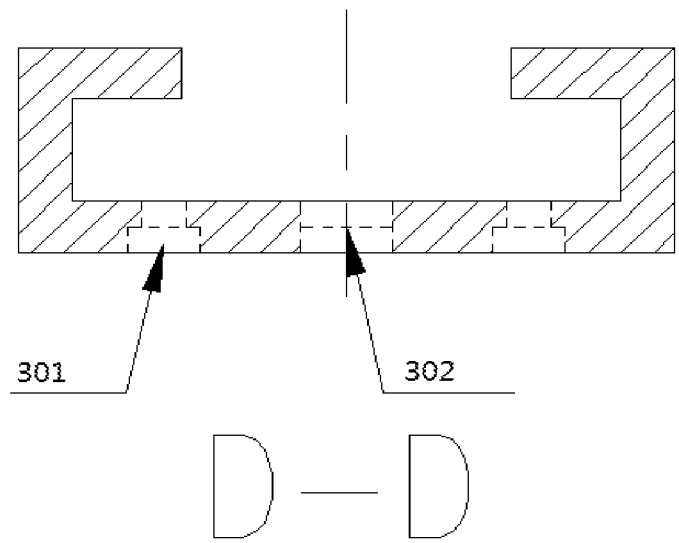
FIG. 18 is a cross-sectional view along D-D in FIG. 17.

FIG. 16 to FIG. 18 are schematic structural views of the wear-resisting plate 3 respectively. The wear-resisting plate 3 is channel steel-shaped, fitted on the strip-shaped plate, and connected to the strip-shaped plate through wear-resisting plate screws 7 and four counter bores 301 uniformly provided on a working surface of the wear-resisting plate 3. The working surface of the wear-resisting plate 3 is cast with an abrasion-resistant alloy, a wear-resisting plate oil inlet hole 302 is provided at the center of the wear-resisting plate 3, and an oil groove 303 in communication with the wear-resisting plate oil inlet hole 302 is provided on the working surface of the wear-resisting plate 3, for lubricating the working surface of the wear-resisting plate 3 on the slide block, thereby reducing the friction and abrasion.

Figure 19:
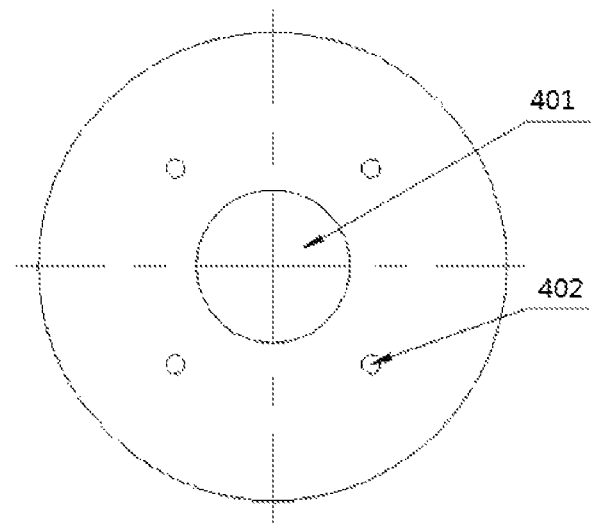
FIG. 19 is a front view of a sealing cover.

FIG. 19 is a schematic structural view of the sealing cover 4. The sealing cover 4 is provided with a central hole 401 having a hole diameter identical to the inner diameter of the sleeve 5, four sealing cover screw positioning holes 402 are uniformly provided on the circumference away from the central hole 401, and sealing cover screws 6 pass through the four sealing cover screw positioning holes 402 to fix the sealing covers 4 to the left and right end surfaces of the crosshead pin 1, such that the oil holes in the crosshead pin 1 are sealed, leakage of the cooled oil is prevented, and the sleeve 5 is not sealed, thereby ensuring that the through holes in the sleeve 5 can contact air and the cooling effect is improved.

The length of the sleeve 5 is identical to that of the crosshead pin 1, the outer diameter of the sleeve 5 is slightly larger than the inner diameter of the petal-shaped through holes 112 of the crosshead pin 1, and the sleeve 5 and the petal-shaped through holes 112 are in close-fit connection through a shrinkage fit process, with the interference fit tolerance δ of 0.03 to 0.06 mm.

The working principle is as follows.

As shown in FIG. 1, when the crosshead component is assembled, the sleeve 5 is fitted in the petal-shaped through holes 112 of the crosshead pin 1 through the shrinkage fit process, and it is sured that the left and right end surfaces of the sleeve 5 are aligned with the left and right end surfaces of the crosshead pin 1 after the fitting; then, the slide blocks 2 are installed on the left and right ends of the crosshead pin 1, and the installation of the slide blocks 2 should make sure that the slide block upper oil holes 204 of the slide blocks 2 respectively correspond in position to the crosshead pin oil inlet hole 107 and the crosshead pin oil outlet hole 108 on the crosshead pin 1, thereby ensuring smooth flowing of oil in the oil way; after the slide blocks 2 are fitted in the crosshead pin 1, the sealing covers 4 are fixed to the two end surfaces of the crosshead pin 1 by using the sealing cover screws 6, and therefore the slide blocks 2 are fixed and the oil holes in the crosshead pin 1 are sealed; and the wear-resisting plates 3 are fixedly connected to the external sides of the strip-shaped plates of the slide blocks 2 through the wear-resisting plate screws 7, thereby completing the assembly process of the crosshead component.

When the crosshead component works, the rectangular plane 103 on the upper part of the crosshead pin 1 matches with the bottom surface of the piston rod, the piston rod is fixed, by screws, in the piston rod threaded holes 104 on the rectangular plane 103 on the upper part of the crosshead pin 1, the arc surface in the middle of the crosshead pin 1 matches with and is connected to the small end of the connecting rod, the working surfaces of the wear-resisting plates 3 at the front and back ends of the slide blocks 2 match with a crosshead guide plate in a frame of the diesel engine, and the wear-resisting plates 3 slide relative to the guide plate in the guide direction of the crosshead guide plate. In the operation process, a large amount of heat is produced between the parts that move relative to each other due to friction, and if the parts cannot be cooled in time, they may be damaged and even the normal operation of the diesel engine may be affected.

The oil way system of the present invention can effectively cool and lubricate the parts, and as shown in FIG. 7 to FIG. 18, the lubricant enters the slide block upper oil hole 204 on the upper part of the right slide block 2 in the crosshead component, flows through the slide block upper oil hole 204 to enter the crosshead pin oil inlet hole 107 on the right end of the crosshead pin 1, and then enters the petal-shaped through holes 112 in the pin shaft, such that the petal-shaped through holes 112, the sleeve 5 and the sealing covers 4 fixed on the left and right end surfaces of the crosshead pin 1 form a closed oil way space, the lubricant is filled in the whole closed space through the spiral through groove 115 between the petal-shaped through holes 112, and a part of the lubricant filled in the closed space enters the piston head through the piston rod oil inlet hole 105 at the center of the piston rod positioning surface 103 on the upper end of the crosshead pin 1, thereby cooling the piston head. After cooling the piston head, the lubricant returns to the four piston rod oil return holes 106 on the piston rod positioning surface 103 at the upper end of the crosshead pin 1 through an oil return pipeline in the piston rod, and the lubricant in the piston rod oil return holes 106 enters the axial deep hole 109 that is perpendicular to and intersects the oil return holes. The lubricant in the axial deep hole 109 further enters the shallow hole 110 that is perpendicular to and intersects the initial end of the axial deep hole 109, the lubricant in the shallow hole 110 further enters the via hole 111 that is perpendicular to and intersects the shallow hole 110, the via hole 111 is in communication with the crosshead pin oil outlet hole 108 on the left side of the crosshead pin 1, and the lubricant finally enters the slide block upper oil hole 204 on the upper part of the slide block 2 through the crosshead pin oil outlet hole 108 on the left side of the crosshead pin 1 and thus is discharged. The openings of the axial deep hole 109 provided on the crosshead, the shallow hole 110 intersecting the axial deep hole 109, and the via hole 111 intersecting the shallow hole 110 all need to be sealed by using a seal plug, so as to ensure that the lubricant in the crosshead pin 1 can only be discharged from the crosshead pin oil outlet hole 108 at the end of the crosshead pin 1, another part of the lubricant passes through the bearing bush oil inlet holes 114 on the circumference surface at the center of the crosshead pin 1 to lubricate and cool the bearing on the small end of the connecting rod connected to the crosshead pin 1, and still another part of the lubricant passes through the oil holes 102 on the step-shaped planes 101 at the left and right ends of the crosshead pin 1 and the matching slide block side oil holes 203 on the left and right sides of the slide blocks 2 to enter the working surfaces of the wear-resisting plates 3, thereby lubricating and cooling the working surfaces of the wear-resisting plates 3. Through the above arrangement of the oil way, the lubricant can cool and lubricate the parts that move relative to each other in time; because the inner walls of the sleeve 5 directly contact air, the heat dissipation effect is better, and the parts are effectively prevented from failing due to over high temperature; and meanwhile the connection manner of interference fit between the interior of the crosshead pin 1 and the sleeve 5 can ensure normal operation of the crosshead component while reducing the weight of the crosshead component, thereby reducing the impact of the crosshead component on the transmission of the crank connecting rod mechanism to the maximum extent.

The slide blocks 2 in the crosshead component are continuously subjected to sliding friction at a variable speed during the operation process, so serious abrasion is caused. Only the wear-resisting plates 3 on the strip-shaped plates of the slide blocks 2 need to be replaced in the case of serious abrasion of the slide blocks 2, instead of replacing the whole slide blocks 2. Therefore, the crosshead component has excellent interchangeability, economy and convenience.

What is claimed is:

1. A crosshead component of a large diesel engine, wherein the crosshead component consists of a crosshead pin (1), slide blocks (2), wear-resisting plates (3), sealing covers (4), and a sleeve (5), and has a structure with H-shaped cross and longitudinal sections; the crosshead pin (1) is a cylinder provided with petal-shaped through holes (112); the slide blocks (2) are respectively fitted on and connected to outer circles of left and right ends of the crosshead pin (1); the sleeve (5) is inserted in and connected to the petal-shaped through holes (112) of the crosshead pin (1) to form oil inlet/return way cavities; left and right end surfaces of the crosshead pin (1) are respectively connected to the sealing covers (4) for sealing the oil way cavities; front and back ends of the slide blocks (2) are respectively connected to the wear-resisting plates (3);

planes (101) matching with the slide blocks (2) are symmetrically provided, in an over-center manner, on front and back outer circumference surfaces at the left and right ends of the crosshead pin (1), each of the planes (101) is provided with an oil hole (102) in communication with the petal-shaped through holes (112) of the crosshead pin (1), and a rectangular plane (103) for positioning a piston rod is provided on an upper outer circumference surface at the center of the crosshead pin (1); two piston rod threaded holes (104) in connection to the piston rod, four piston rod oil return holes (106) in communication with the petal-shaped through holes (112) of the crosshead pin (1) and one piston rod oil inlet hole (105) at the center of the rectangular plane (103) are provided on the rectangular plane (103) in an over-center manner; a crosshead pin oil inlet hole (107) and a crosshead pin oil outlet hole (108) that are in communication with the petal-shaped through holes (112) of the crosshead pin (1) and are perpendicular to the rectangular plane (103) are provided on the upper part of the outer circumference surface at the left and right ends of the crosshead pin (1);

an axial deep hole (109) that is in communication with the piston rod oil return holes (106) and in parallel with the axis is provided on the upper part of the left end surface of the crosshead pin (1) and away from the axial center, and a shallow hole (110) perpendicular to and in communication with the axial deep hole (109) is provided on an outer circumference surface of an initial end of the axial deep hole (109); a via hole (111) radially passing through the crosshead pin (1) and in communication with the shallow hole (110) is provided at a position away from the shallow hole (110) and corresponding to the shallow hole (110) in an anticlockwise direction about the axis;

the petal-shaped through holes (112) on the crosshead pin (1) are communicated by using a provided spiral through groove (115), and three bearing bush oil inlet holes (114) in communication with the petal-shaped through holes (112) are uniformly provided on the circumference surface at the center of the crosshead pin (1), for lubricating and cooling a bearing bush between the crosshead pin (1) and a small end of a connecting rod;

each of the slide blocks (2) consists of a slender waist-shaped plate in the middle and strip-shaped plates at front and back ends in perpendicular connection, a slotted hole (201) matching with one of the two ends of the crosshead pin (1) is provided at the center of the slender waist-shaped plate, a slide block side oil hole (203) in communication with the slotted hole (201) is provided at the center of the strip-shaped plates at the front and back ends of the slide block (2), and a waist-shaped arc surface on the upper part of the slender waist-shaped plate is provided with a slide block upper oil hole (204) in communication with the slotted hole (201);

each of the wear-resisting plates (3) is shaped to be fitted on the strip-shaped plate, fitted on the strip-shaped plate, and connected to the strip-shaped plate through wear-resisting plate screws (7) and four counter bores (301) uniformly provided on a working surface of the wear-resisting plate (3); a wear-resisting plate oil inlet hole (302) is provided at the center of the wear-resisting plate (3), and an oil groove (303) in communication with the wear-resisting plate oil inlet hole (302) is provided on the working surface of the wear-resisting plate (3), for lubricating the working surface of the wear-resisting plate (3) on the slide block, thereby reducing the friction and abrasion;

each of the sealing covers (4) is provided with a central hole (401) having a hole diameter identical to the inner diameter of the sleeve (5), four sealing cover screw positioning holes (402) are uniformly provided on the circumference away from the central hole (401), and sealing cover screws (6) pass through the four sealing cover screw positioning holes (402) to fix the sealing covers (4) to the left and right end surfaces of the crosshead pin (1), such that the oil holes in the crosshead pin (1) are sealed, and the sleeve (5) is not sealed, thereby ensuring that the through holes in the sleeve (5) contact air.

2. The crosshead component of the large diesel engine according to claim 1, wherein the length of the crosshead pin (1) is identical to that of the sleeve (5), and the outer diameter of the sleeve (5) is larger than the inner diameter of the petal-shaped through holes (112) of the crosshead pin (1), with the interference fit tolerance $\delta$ of 0.03 to 0.06 mm.

3. The crosshead component of the large diesel engine according to claim 1, wherein the petal-shaped through holes (112) provided on the crosshead pin (1) are quincuncial through holes.

4. The crosshead component of the large diesel engine according to claim 1, wherein the working surface of the wear-resisting plate (3) is cast with an abrasion-resistant alloy.

5. The crosshead component of the large diesel engine according to claim 1, wherein four trapezoidal lightening holes (202) are uniformly provided on the slide block (2).

6. The crosshead component of the large diesel engine according to claim 5, wherein the width of the strip-shaped plates on the slide block (2) is larger than the thickness of the slender waist-shaped plate.

7. The crosshead component of the large diesel engine according to claim 1, wherein the width of the strip-shaped plates on the slide block (2) is larger than the thickness of the slender waist-shaped plate.

* * * * *